United States Patent
Kuttner et al.

(10) Patent No.: US 8,676,873 B2
(45) Date of Patent: Mar. 18, 2014

(54) DIGITAL WAVEFORM SYNTHESIS

(75) Inventors: Franz Kuttner, St. Ulrich (AT);
Michael Fulde, Drobollach (AT)

(73) Assignee: Infineon Technologies AG, Neubiberg (DE)

( * ) Notice: Subject to any disclaimer, the term of this patent is extended or adjusted under 35 U.S.C. 154(b) by 642 days.

(21) Appl. No.: 12/862,749

(22) Filed: Aug. 24, 2010

(65) Prior Publication Data

US 2012/0049904 A1 Mar. 1, 2012

(51) Int. Cl.
*G06F 1/02* (2006.01)
(52) U.S. Cl.
USPC ........................................................ 708/276
(58) Field of Classification Search
None
See application file for complete search history.

(56) References Cited

U.S. PATENT DOCUMENTS

| | | | |
|---|---|---|---|
| 4,205,386 A * | 5/1980 | Ruszala et al. | 708/8 |
| 4,216,387 A * | 8/1980 | Reed | 327/132 |
| 6,188,261 B1* | 2/2001 | Nosaka et al. | 327/261 |
| 7,653,678 B2* | 1/2010 | Bushman et al. | 708/845 |
| 7,928,881 B1* | 4/2011 | Baek et al. | 341/145 |
| 2008/0016141 A1* | 1/2008 | Bushman et al. | 708/845 |
| 2012/0049904 A1* | 3/2012 | Kuttner et al. | 327/129 |

* cited by examiner

*Primary Examiner* — David H Malzahn
(74) *Attorney, Agent, or Firm* — SpryIP, LLC (57) ABSTRACT

A circuit is provided with a plurality current cells. The current cells each comprise a main current source and an auxiliary current source coupled in parallel. The main current source supplies a main current to a current output of the current cell, and the auxiliary current source supplies an auxiliary current to the current output of the current cell. The main current sources are weighted according to a first predefined waveform, and the auxiliary current sources are weighted according to a second predefined waveform which is different from the first predefined waveform.

29 Claims, 7 Drawing Sheets

DIGITAL WAVEFORM SYNTHESIS

FIELD OF THE INVENTION

The present invention relates to circuits and methods for digital waveform synthesis.

BACKGROUND OF THE INVENTION

In synthesis of a sine waveform, it is known to use direct digital frequency synthesis by switching a number of weighted current cells on the basis of a digital code signal. The performance of a corresponding waveform synthesizer can be defined by the spurious-free dynamic range (SFDR) of the generated sine wave at a certain frequency. The SFDR is typically limited by limited output impedance of current sources used in the current cells of the waveform synthesizer. The effect of the limited output impedance is that, with increasing number of activated current cells, the output current of each current cell decreases from its nominal value. The output signal of the waveform synthesizer will therefore deviate from an ideal sine waveform.

Accordingly, there is a need for techniques which allow for accurate digital waveform synthesis.

DETAILED DESCRIPTION

In the following, some embodiments of the present invention will be described in more detail and with reference to the accompanying drawings. It is to be understood that the following description is given only for the purpose of illustration and is not to be taken in a limiting sense. The scope of the invention is not intended to be limited by the embodiments as described hereinafter, but is intended to be limited only by the appended claims.

Further, it is to be understood that in the following description of embodiments any direct connection or coupling between functional blocks, devices, components, circuit elements or other physical or functional units as described or shown in the drawings could also be implemented by an indirect connection or coupling, i.e. a connection or coupling comprising one or more intervening elements. Furthermore, it should be appreciated that functional blocks or units shown in the drawings may be implemented as separate circuits, but may also be fully or partially implemented in a common circuit. In other words, the description of various functional blocks is intended to give a clear understanding of various functions performed in a device and is not to be construed as indicating that these functional blocks have to be implemented as separate functional units. For example, one or more functional blocks may be implemented by programming a processor with suitably designed program code.

It should be noted that the drawings are provided to give an illustration of some aspects of embodiments of the present invention and therefore are to be regarded as schematic only. In particular, the elements as shown in the drawings are not necessarily to scale with each other, and the placement of various elements and drawings is chosen to provide a clear understanding of the respective embodiment and is not to be construed as necessarily being a representation of the actual relative location of the illustrated structures.

It is to be understood that the features of the various embodiments described herein may be combined with each other as appropriate. On the other hand, describing an embodiment with a plurality of features is not to be construed as indicating that all the described features are necessary for practicing the present invention. For example, other embodiments may comprise less features and/or alternative features.

In the following, embodiments of the invention will be described, which relate to digital signal generation in a waveform synthesizer. In the illustrated embodiments, the waveform synthesizer is configured to generate an output signal having a sine waveform. However, it is to be understood that the illustrated concepts may be applied in connection with other waveforms as well, e.g. a triangular waveform, a sawtooth waveform, or the like.

Figure 1:
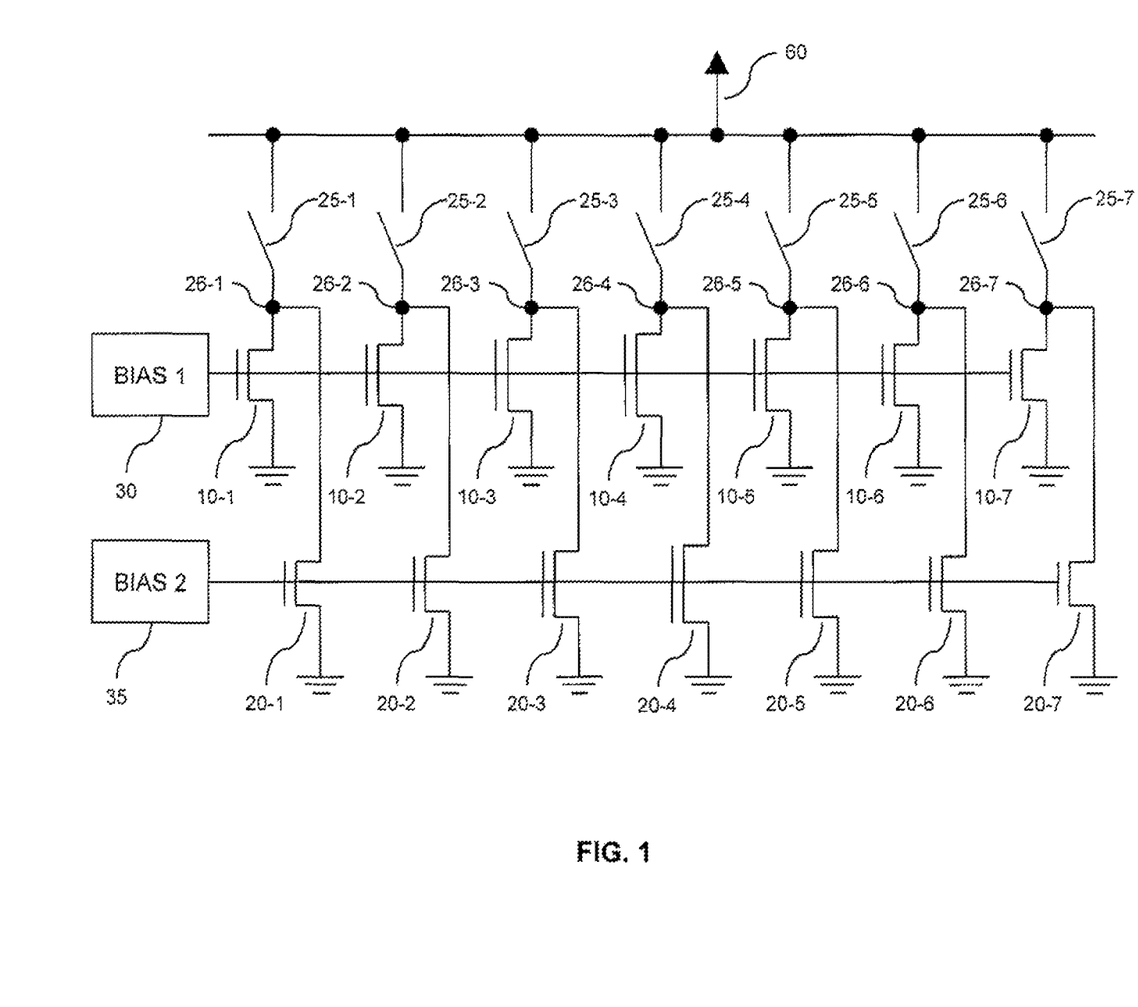
FIG. 1 schematically illustrates a circuit according to an embodiment of the invention.

FIG. 1 schematically illustrates a circuit according to an embodiment of the invention.

The circuit is provided with a number of current cells, each including a main current source and an auxiliary current source. The main current sources include transistors 10-1, 10-2, 10-3, 10-4, 10-5, 10-6, 10-7. The auxiliary current sources include transistors 20-1, 20-2, 20-3, 20-4, 20-5, 20-6, 20-7. In other words, a first current cell includes the transistors 10-1 and 20-1, a second current cell includes the transistors 10-2 and 20-2, a third current cell includes the transistors 10-3 and 20-3, a fourth current cell includes the transistors 10-4 and 20-4, a fifth current cell includes the transistors 10-5 and 20-5, a sixth current cell includes the transistors 10-6 and 20-6, and a seventh current cell includes the transistors 10-7 and 20-7. Here, it is to be understood that the illustrated number of the current cells is merely exemplary and that practical implementations may include a smaller or a larger number of current cells. For example, in an embodiment with 10 bit digital control of current cells, the number of current cells could be $2^{10}=1024$. The transistors may be implemented as p-channel metal oxide semiconductor (PMOS) transistors or as n-channel metal oxide semiconductor (NMOS) transistors. In typical implementations, the auxiliary current of an auxiliary current source will be smaller than the main current of the corresponding main current source. Further, it is to be understood that the current cells may include further components, which are provided in addition to the transistor 10-1, 10-2, 10-3, 10-4, 10-5, 10-6, 10-7 of the main current source and the transistor 20-1, 20-2, 20-3, 20-4, 20-5, 20-6, 20-7 of the auxiliary current source. For example, the main current sources and/or the auxiliary current sources may include cascode transistors.

In each of the current cells, the auxiliary current source is coupled in parallel to the main current source. In this way, an auxiliary current generated by the auxiliary current source is added to a main current generated by the main current source at a respective current output node 26-1, 26-2, 26-3, 26-4, 26-5, 26-6, 26-7 of the current cell.

Further, the circuit includes a plurality of switches 25-1, 25-2, 25-3, 25-4, 25-5, 25-6, 25-7. The switches 25-1, 25-2, 25-3, 25-4, 25-5, 25-6, 25-7 couple the current output nodes 26-1, 26-2, 26-3, 26-4, 26-5, 26-6, 26-7 of the individual current cells to a signal output 60 of the circuit. Accordingly, the switches 25-1, 25-2, 25-3, 25-4, 25-5, 25-6, 25-7 allow for selectively coupling the current cells to the signal output 60, thereby activating one or more of the current calls. The switches may be implemented using transistors. In the illustrated example, the selective coupling of the current cells to the signal output 60 is controlled on the basis of a thermometer code signal (not illustrated in FIG. 1). However, it is to be understood that other types of codes signals could be used as well. In this way, an output signal is generated at the signal output 60, which includes contributions from a selected number of the current cells. Depending on the current cells coupled to the signal output 60, the signal value at the signal output varies.

In addition, the circuit includes a first bias source 30 for the main current sources, and a second bias source 35 for the auxiliary current sources. The first bias source 30 provides a first bias signal which is supplied to control inputs of the main current sources. In the illustrated embodiment, the first bias signal is provided in the form of a first bias voltage and is supplied to gate terminals of the transistors 10-1, 10-2, 10-3, 10-4, 10-5, 10-6, 10-7 of the main current sources. Similarly, the second bias source 35 provides a second bias signal to control inputs of the auxiliary current sources. In the illustrated example, the second bias signal is provided in the form of a bias voltage and is supplied to gate terminals of the transistors 20-1, 20-2, 20-3, 20-4, 20-5, 20-6, 20-7 of the auxiliary current sources. Accordingly, the main current sources are operated with the same bias signal, i.e. the first bias signal, and the auxiliary current sources are operated with the same bias signal, i.e. the second bias signal. The magnitudes of the main currents generated by the main current cells are collectively controlled by the first bias signal. The magnitudes of the auxiliary currents generated by the auxiliary current cells are collectively controlled by the second bias signal.

In the circuit of FIG. 1, the main current sources are weighted according to a first predefined waveform. For example, if the circuit is supposed to be used in waveform synthesis of a sine waveform, the main current sources may be weighted according to a sine waveform. This means that the main current generated by the different current cells varies as a function of an index of the current cell. The first predefined waveform determines the relative magnitudes of the main currents of different current cells. The first bias signal in turn collectively controls the magnitudes of all main currents, without changing the relative magnitudes. In the circuit of FIG. 1, weighting of the main current sources is accomplished by providing the transistors 10-1, 10-2, 10-3, 10-4, 10-5, 10-6, 10-7 with different transistor channel widths. For example, if the current cells are indexed from 1 to n, weighting of the main current sources according to a sine waveform may be accomplished by providing the transistors 10-1, 10-2, 10-3, 10-4, 10-5, 10-6, 10-7 with widths $W_M$ varying according to $$W_M \propto \sin(n).$$

The auxiliary current sources are weighted according to a second predefined waveform, which is different from the first predefined waveform. For example, if the circuit is supposed to be used in waveform synthesis of a sine waveform, the auxiliary current sources may be weighted according to a sine squared waveform. This means that the main current generated by the different current cells varies as a function of an index of the auxiliary current source. The second predefined waveform determines the relative magnitudes of the auxiliary currents of different current cells. The second bias signal in turn collectively controls the magnitudes of all auxiliary currents, without changing the relative magnitudes. In the circuit of FIG. 1, weighting of the auxiliary current sources is accomplished by providing the transistors 20-1, 20-2, 20-3, 20-4, 20-5, 20-6, 20-7 with different transistor channel widths. For example, if the current cells are indexed from 1 to n, weighting of the auxiliary current sources according to a sine squared waveform may be accomplished by providing the transistors 20-1, 20-2, 20-3, 20-4, 20-5, 20-6, 20-7 with widths $W_A$ varying according to $$W_A \propto \sin^2(n).$$

By providing the auxiliary current sources, which are weighted according to the second predefined waveform, a code dependent current is added to the signal contribution from the main current sources. This code dependent current may be used to accurately compensate code dependent variations in the individual main currents generated by the main current sources. That is to say, a reduction in the main currents, which may occur due to finite current source impedance when a large number of the current cells are active, can be compensated by the additional contribution from the auxiliary current cells.

Figure 2:
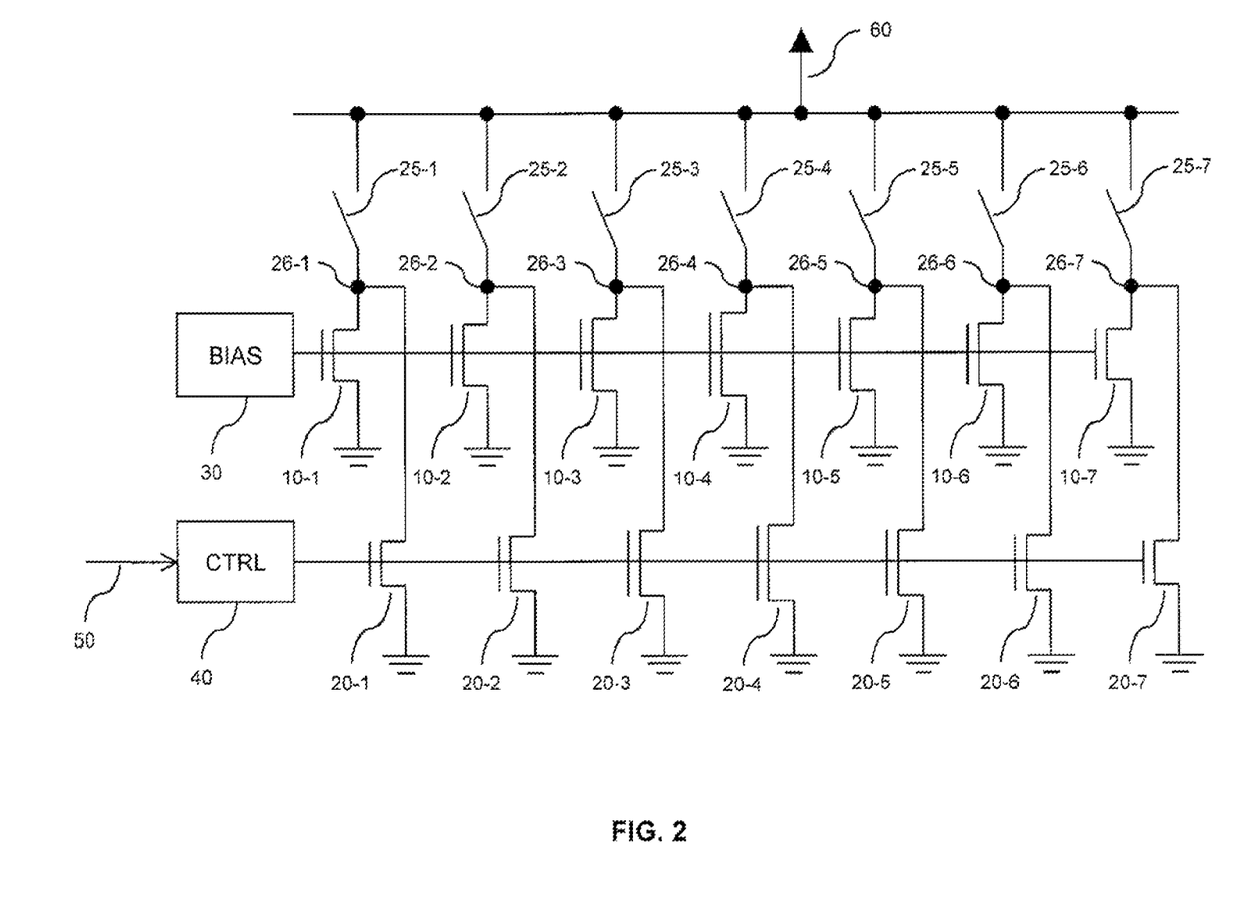
FIG. 2 schematically illustrates a circuit according to a further embodiment of the invention.

FIG. 2 schematically illustrates a circuit according to a further embodiment of the invention. The circuit of FIG. 2 is generally similar to that of FIG. 1, and corresponding components have been designated with the same reference signs. The following description will therefore refrain from repeatedly describing these components and rather focus on the differences to the circuit of FIG. 1.

As can be seen, in the circuit of FIG. 2 the second bias source 35 has been replaced by a control circuit 40. The control circuit 40 is supplied with an input signal 50 and generates, on the basis of the input signal 50, a control signal which is supplied to the control inputs of the auxiliary current sources. In this way, the compensation effect due to the contribution of the auxiliary currents may be adapted to certain operating conditions or to external parameters. According to an embodiment, the current cells are activated on the basis of a periodic code signal, and the input signal 50 includes frequency information of the periodic code signal. In this way, the compensation may take into account the effect of parasitic capacitances in the current sources. Such parasitic capacitances may cause a variation of the main currents or auxiliary currents as a function of frequency.

Figure 3:
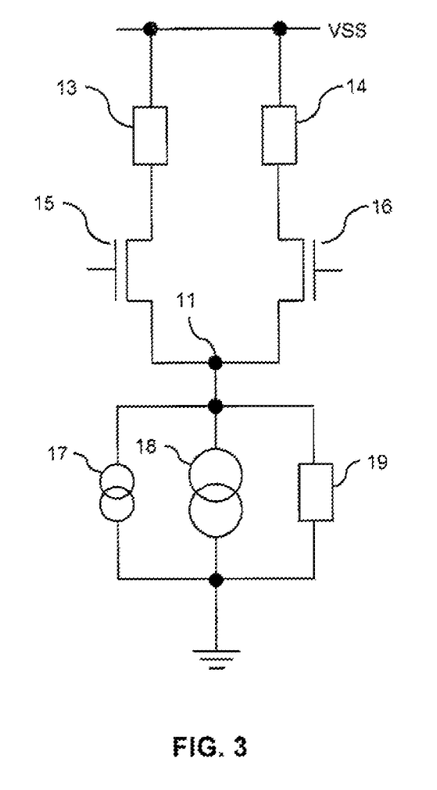
FIG. 3 schematically illustrates a current cell according to an embodiment of the invention.

FIG. 3 schematically illustrates a circuit implementation of a current cell, which can be used in the circuits of FIGS. 1 and 2.

As illustrated, the current cell includes a main current source 18 and an auxiliary current source 17. The main current source are coupled in parallel between a current output node 11 and a first supply voltage rail. In the illustrated example, the first supply voltage rail is ground. In addition, the circuit implementation includes two differential current paths coupled between the current output node 11 and a second supply voltage rail, in the illustrated example VSS, i.e. a high supply voltage rail. The first differential current path includes a load resistor 13 and a switching transistor 15 coupled in series between the current output node 11 and the second supply voltage rail. The second differential current path includes a load resistor 14 and a switching transistor 16 coupled in series between the current output node 11 and the second supply voltage rail. The switching transistors 15, 16 may be used to selectively direct the cell current, formed by the sum of the main current of the main current cell and the auxiliary current of the auxiliary current cell, to either the first differential current path or the second differential current path. Accordingly, the switching transistors 15, 16 have a similar function as the switches 25-1, 25-2, 25-3, 25-4, 25-5, 25-6, 25-7 of FIGS. 1 and 2. For this purpose, the switching transistors 15, 16 may be of complementary type, the switching transistor 15 may be of the NMOS type, and the switching transistor 16 may be of the PMOS type, or vice versa.

In addition, FIG. 3 illustrates a current source impedance 19. The current source impedance may be regarded as being formed of an output resistance of the current sources 17, 18, e.g. to a GDS value of the transistor forming the current source, and a parasitic capacitance. The parasitic capacitance typically has the effect that the cell current varies as a function of frequency. This may be taken into account by the control circuit 40 of FIG. 2.

Figure 4:
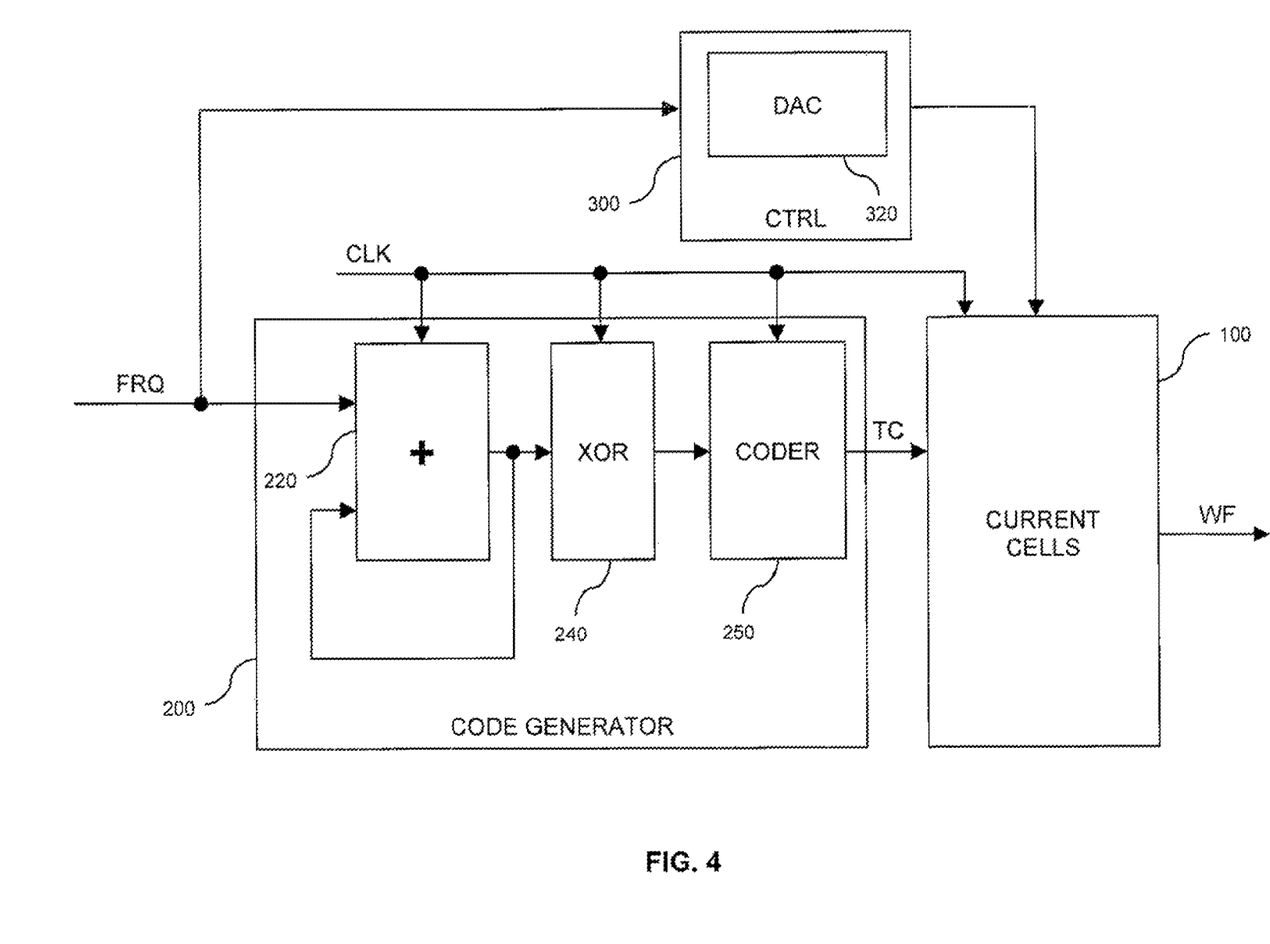
FIG. 4 schematically illustrates a waveform synthesizer according to an embodiment of the invention.

FIG. 4 schematically illustrates a waveform synthesizer. The waveform synthesizer may be based on the circuits as explained in connection with FIGS. 1-3. The waveform synthesizer may be configured to generate a sinusoidal waveform signal WF. However, other waveforms could be generated as well.

As illustrated, the waveform synthesizer includes a code generator 200 and an array of current cells 100. In addition, the waveform synthesizer includes a control circuit 300.

The current cells 100 are each implemented with a main current source and an auxiliary current source as explained in connection with FIGS. 1-3. Due to the weighting of the main current sources and the auxiliary current sources according to different waveforms, code dependent variations in the cell currents can be compensated for in the waveform signal WF generated at the output of the current cells 100.

In the illustrated example, the current cells 100 are selectively activated by a periodic thermometer code signal TC. The thermometer code signal TC is generated by the code generator 200. For this purpose, the code generator 200 includes an summing register 220, an Exclusive OR (XOR) register 240, and a coder 250. The summing register 220 is supplied with a frequency signal FRQ, which represents a desired frequency of the generated waveform signal WF. The XOR register 240 receives the output signal of the summing register 220 and supplies its output signal to the coder 250. The coder 250 then generates the periodic thermometer code signal TC. If the summing register 220 and the XOR register 240 operate on binary coded signals, the coder 250 may transcode the binary coded output signal of the XOR register 240 to the thermometer code signal TC. The summing register 220, the XOR register 240, the coder 250, as well as the current cells 100 are further supplied with a clock signal CLK. The summing register 220 operates to add an increment value defined by the frequency signal FRQ to a feedback signal from the output of the summing register 220. This causes the value of the summing register 220 to successively increase with each clock cycle of the clock signal CLK until it reaches a maximum value and is reset. In this way, a sawtooth like digital signal is generated at the output of the summing register 220. The XOR register 240 transforms the sawtooth like digital signal to a triangular digital signal. The coder 250 transcodes the triangular digital signal to the thermometer code signal TC. In some embodiments, the summing register 220 and the XOR register 240 may be implemented to operate on thermometer coded signals. In this case, the coder 250 may be omitted or provided at a different position. By selective activation of the current cells 100 on the basis of the thermometer code signal TC, the waveform signal WF is generated with a waveform defined by the weighting of the main current sources of the current cells 100, e.g. a sine waveform, and with a frequency defined by the frequency signal FRQ. However, it is to be understood that other embodiments may use different implementations of the code generator 200.

As further illustrated, the frequency signal FRQ is further supplied to the control circuit 300. The control circuit 300 processes the frequency signal FRQ to generate a control signal for collectively controlling the magnitudes of auxiliary currents generated by the auxiliary current sources in the current cells 100. In other words, the control circuit 300 accomplishes similar functions as the control circuit 40 of FIG. 2. For example, if the frequency signal FRQ indicates an increased frequency, the control circuit 300 may generate the control signal to collectively increase the magnitude of the auxiliary currents. On the other hand, if the frequency signal FRQ indicates a decreased frequency, the control circuit 300 may generate the control signal to collectively decrease the magnitude of the auxiliary currents.

In the illustrated example, the frequency signal FRQ is a digital signal and the auxiliary current cells are controlled by an analog control signal, i.e. a transistor bias voltage as explained in connection with FIG. 1. The control circuit therefore includes a digital-to-analog converter (DAC) 320. The digital-to-analog converter 320 allows for converting the digital frequency signal into the analog control signal. It is to be understood that the control circuit 300 may include further components, which have not been illustrated. For example, the control circuit could include a processor or the like for processing the digital frequency signal FRQ, and the digital-to-analog converter 320 could then be used to convert the processed digital frequency signal FRQ into the analog control signal.

Figure 5:
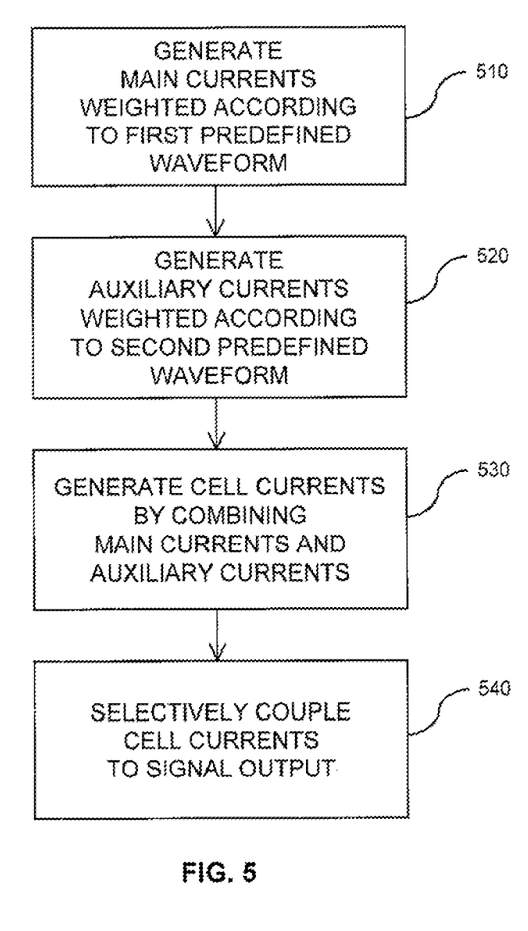
FIG. 5 shows a flowchart for illustrating a method according to an embodiment of the invention.

FIG. 5 shows a flowchart for schematically illustrating a method according to an embodiment of the invention. The method may be used to implement the above-described concepts, e.g. in a waveform generator as illustrated in FIG. 4.

At step 510, main currents are generated. The main currents are weighted according to a first predefined waveform, e.g. a sine waveform. The main currents may be generated by main current sources, e.g. implemented by transistors having different widths as explained in connection with FIG. 1.

At step 520, auxiliary currents are generated. The auxiliary currents are weighted according to a second predefined waveform which is different from the first predefined waveform. For example, if the first predefined waveform is a sine waveform, the second predefined waveform may be a sine squared waveform. The auxiliary currents may be generated by auxiliary current sources, e.g. implemented by transistors having different widths as explained in connection with FIG. 1.

At step 530, cell currents are generated by combining the main currents and corresponding auxiliary currents. In this way, cell currents may be generated, in which a code dependent variation is compensated for by the contribution of the auxiliary currents.

At step 540, the cell currents are selectively coupled to a signal output. This may be accomplished under control of a periodic code signal, e.g. a periodic thermometer code signal.

Figure 6:
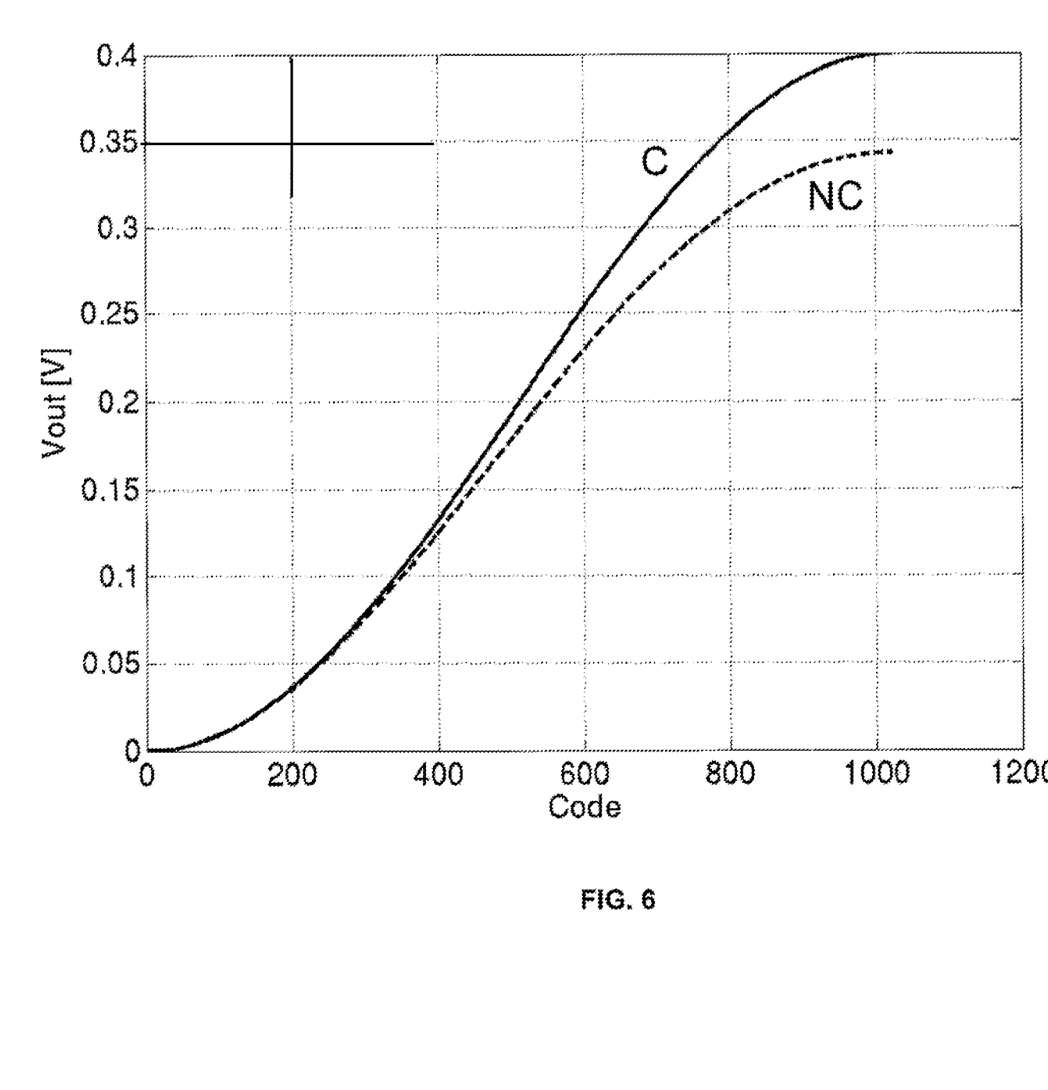
FIG. 6 shows a comparison of a waveform signal generated according to an embodiment of the invention to a conventional waveform signal.

FIG. 6 shows exemplary output signals of circuits using weighted current cells to produce an output signal having a sine waveform. More specifically, FIG. 6 compares an output signal generated with compensation by auxiliary currents as described herein (denoted by C) to an output signal generated without compensation by auxiliary currents (denoted by NC).

Both output signals are generated by successively activating 1024 current cells on the basis of a thermometer code. In FIG. 6, the value on the code axis corresponds to the number of activated current cells.

As can be seen, with increasing code value, i.e. increasing number of activated current cells, the output signal generated without compensation increasingly deviates from the output signal generated with compensation towards lower signal strengths. The output signal generated with compensation, in turn, closely matches the desired sine waveform.

Figure 7:
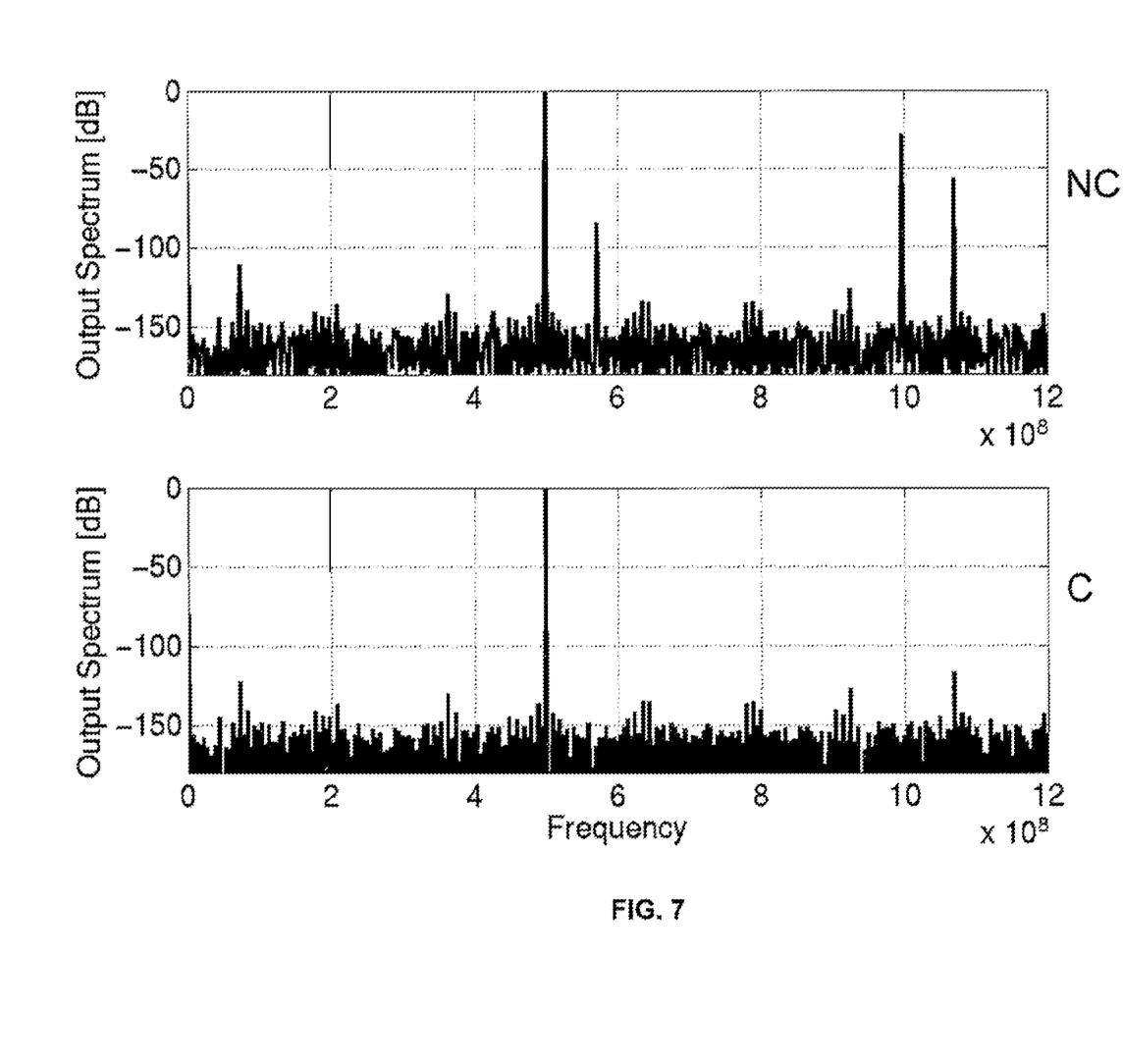
FIG. 7 shows a comparison of a frequency spectrum of a waveform signal generated according to an embodiment of the invention to a frequency spectrum of a conventional waveform signal.

FIG. 7 shows exemplary frequency spectra of output signals of circuits using weighted current cells to produce an output signal having a sine waveform. More specifically, FIG. 7 compares a frequency spectrum of an output signal generated with compensation by auxiliary currents as described herein (lower part of FIG. 7, denoted by C) to a frequency spectrum of an output signal generated without compensation by auxiliary currents (upper part of FIG. 7, denoted by NC). In both cases, the output signals are generated by successively activating 1024 current cells on the basis of a periodic thermometer code signal having a frequency of 500 MHz.

As can be seen, the frequency spectrum of the output signal generated without compensation includes a spike at the desired frequency of 500 MHz, but also spurious spikes at other frequencies, e.g. at 10 MHz. As compared to that, the frequency spectrum of the output signal generated with compensation is substantially spurious free.

It is to be understood that the above-described embodiments serve only as examples for implementations of concepts according to the present invention, and that these concepts may be applied in various manners which are not restricted to the described embodiments. For example, the concepts may be applied to various types of waveforms, among which the sine waveform is only one example. Also, the concepts could be extended to use one or more additional auxiliary current in each current cell. The additional auxiliary currents could then be weighted according to further different predefined waveforms, thereby refining the compensation effect. Moreover, it is to be understood that the generated waveform signals may be used in various applications, e.g. in communication devices, receivers, transmitters. For example, the generated waveform signals could be used as carrier signals. Further, it is to be understood that the current cells could be implemented in a differential manner, e.g. as illustrated in FIG. 1, or in a single-ended manner.

The invention claimed is:

1. A circuit, comprising:
a plurality current cells, each current cell comprising a main current source and an auxiliary current source coupled in parallel to a current output of the current cell, the main current sources being weighted according to a first predefined waveform, and
the auxiliary current sources being weighted according to a second predefined waveform which is different from the first predefined waveform.

2. The circuit according to claim 1,
wherein the first predefined waveform is a sine waveform.

3. The circuit according to claim 2,
wherein the second predefined waveform is a sine squared waveform.

4. The circuit according to claim 1,
wherein the auxiliary current sources each comprise a control input to control a respective auxiliary current generated by the auxiliary current source.

5. The circuit according to claim 4, comprising:
a control circuit configured to generate a control signal supplied to the control inputs of the auxiliary current sources.

6. The circuit according to claim 5,
wherein the control circuit comprises a digital-to-analog converter.

7. The circuit according to claim 5,
wherein the control circuit is configured to generate the control signal on the basis of frequency information received at a frequency input.

8. The circuit according to claim 1, comprising:
a code generator configured to generate a code signal for selectively activating the current cells.

9. The circuit according to claim 8,
wherein the code generator is configured to generate the code signal as a thermometer coded signal.

10. The circuit according to claim 8,
wherein the code generator is configured to generate the code signal as a periodic signal.

11. The circuit according to claim 10,
a control circuit configured to generate a control signal supplied to control inputs of the auxiliary current sources to control a respective auxiliary current generated by the auxiliary current source,
wherein the control circuit is configured to generate the control signal on the basis of a frequency of the periodic code signal.

12. The circuit according to claim 1,
wherein each of the main current sources comprises a transistor, and
wherein the transistors of different main current sources are provided with different transistor channel widths so as to obtain said weighting of the main current sources according to the first predefined waveform.

13. The circuit according to claim 12,
wherein each of the auxiliary current sources comprises a transistor, and
wherein the transistors of different auxiliary current sources are provided with different transistor channel widths so as to obtain said weighting of the auxiliary current sources according to the second predefined waveform.

14. The circuit according to claim 1, comprising:
a plurality of switches coupled between the current outputs of the current cells and a waveform output of the circuit.

15. The circuit according to claim 14,
wherein the second predefined waveform is selected to compensate for nonlinearities of a waveform signal generated at the waveform output.

16. The circuit according to claim 1, wherein the main and auxiliary current sources are weighted using at least a transistor.

17. The circuit according to claim 1, wherein the main and auxiliary current sources are weighted using at least one circuit element.

18. A digital sine waveform synthesizer, comprising:
a plurality current cells, each current cell comprising a main current source and an auxiliary current source coupled in parallel to a current output of the current cell,
a code generator configured to generate a periodic code signal for selectively activating the current cells,
the main current sources being weighted according to a sine waveform, and
the auxiliary current sources being weighted according to a sine squared waveform.

19. The digital sine waveform synthesizer according to claim 18,
   wherein the code generator comprises a frequency input to control a frequency of the periodic code signal,
   wherein each of the auxiliary current sources comprises a control input to control a respective auxiliary current generated by the auxiliary current source, and
   wherein a control loop is provided between the frequency input of the code generator and the control inputs of the auxiliary current sources.

20. The digital sine waveform generator according o claim 19,
   wherein the control loop comprises a digital-to-analog converter.

21. The digital sine waveform synthesizer according to claim 18, wherein the main and auxiliary current sources are weighted using at least a transistor.

22. The digital sine waveform synthesizer according to claim 18, wherein the main and auxiliary current sources are weighted using at least one circuit element.

23. A method, comprising:
   generating a plurality of main currents weighted according to a first predefined waveform,
   for each main current, generating a corresponding auxiliary current, the auxiliary currents being weighted according to a second predefined waveform which is different from the first predefined waveform,
   combining each main current and with the corresponding auxiliary current to generate a plurality of cell currents, and
   selectively coupling one or more of the cell currents to a signal output.

24. The method according to claim 23,
   wherein the first predefined waveform is a sine waveform.

25. The method according to claim 24,
   wherein the second predefined waveform is a sine squared waveform.

26. The method according to claim 23, comprising:
   generating a periodic code signal, and
   controlling the selective coupling of one more of the cell currents to the signal output on the basis of the periodic code signal.

27. The method according to claim 26, comprising:
   controlling the auxiliary currents on the basis of a frequency of the periodic code signal.

28. The method according to claim 23, comprising:
   generating the weighted main currents by means of transistors having different widths.

29. The method according to claim 23, comprising:
   generating the weighted auxiliary currents by means of transistors having different widths.

* * * * *